US009771064B2

United States Patent
Nefcy et al.

(10) Patent No.: US 9,771,064 B2
(45) Date of Patent: Sep. 26, 2017

(54) SYSTEMS AND METHODS FOR IMPROVING VEHICLE DRIVELINE OPERATION

(71) Applicant: Ford Global Technologies, LLC, Dearborn, MI (US)

(72) Inventors: Bernard D. Nefcy, Novi, MI (US); Marvin P. Kraska, Dearborn, MI (US); Daniel S. Colvin, Farmington Hills, MI (US); Matthew J. Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 321 days.

(21) Appl. No.: 14/225,324

(22) Filed: Mar. 25, 2014

(65) Prior Publication Data

US 2015/0274155 A1  Oct. 1, 2015

(51) Int. Cl.
| | | |
|---|---|---|
| *B60W 20/00* | (2016.01) | |
| *B60W 10/02* | (2006.01) | |
| *B60W 20/40* | (2016.01) | |
| *B60W 10/11* | (2012.01) | |
| *B60W 30/20* | (2006.01) | |
| *B60K 6/387* | (2007.10) | |
| *B60K 6/547* | (2007.10) | |
| *B60W 10/06* | (2006.01) | |
| *B60W 10/115* | (2012.01) | |

(Continued)

(52) U.S. Cl.
CPC .............. *B60W 20/40* (2013.01); *B60K 6/387* (2013.01); *B60K 6/547* (2013.01); *B60W 10/02* (2013.01); *B60W 10/06* (2013.01); *B60W 10/11* (2013.01); *B60W 10/115* (2013.01); *B60W 10/30* (2013.01); *B60W 20/30* (2013.01); *B60W 30/20* (2013.01); *B60K 2006/4825* (2013.01); *B60W 2030/203* (2013.01); *B60W 2710/022* (2013.01); *B60W 2710/1005* (2013.01); *B60W 2710/1083* (2013.01); *Y02T 10/6252* (2013.01); *Y10S 903/93* (2013.01)

(58) Field of Classification Search
None
See application file for complete search history.

(56) References Cited

U.S. PATENT DOCUMENTS

| | | |
|---|---|---|
| 4,351,405 A | 9/1982 | Fields et al. |
| 6,176,808 B1 | 1/2001 | Brown et al. |

(Continued)

FOREIGN PATENT DOCUMENTS

WO    WO2013/081011    *  6/2013    ............ B60W 10/02

OTHER PUBLICATIONS

Anonymous, "Method of Detecting Engine Combustion Degradation in a HEV," IPCOM No. 000064093, Published Feb. 18, 2005, 2 pages.

(Continued)

*Primary Examiner* — Robert A Siconolfi
*Assistant Examiner* — Ryan Dodd
(74) *Attorney, Agent, or Firm* — David Kelley; McCoy Russell LLP

(57) ABSTRACT

Systems and methods for improving operation of a hybrid vehicle driveline are presented. In one example, pressures applied to two different clutches are coordinated such that a pressure boost phase of a driveline disconnect clutch does not occur at a same time as a pressure boost phase of a transmission shifting clutch.

12 Claims, 6 Drawing Sheets

(51) Int. Cl.
*B60W 10/30* (2006.01)
*B60W 20/30* (2016.01)
*B60K 6/48* (2007.10)

(56) References Cited

U.S. PATENT DOCUMENTS

| | | | |
|---|---|---|---|
| 6,292,732 B1 | 9/2001 | Steinmetz et al. | |
| 6,390,947 B1 | 5/2002 | Aoki et al. | |
| 6,565,473 B2 | 5/2003 | Endo et al. | |
| 6,722,332 B2 | 4/2004 | Kojima | |
| 7,025,706 B2 | 4/2006 | Katou | |
| 7,143,851 B2 | 12/2006 | Masterson | |
| 7,163,480 B2 | 1/2007 | Supina et al. | |
| 7,223,201 B2 | 5/2007 | Colvin et al. | |
| 7,314,424 B2 | 1/2008 | Supina et al. | |
| 7,440,833 B2 | 10/2008 | Chen | |
| 7,552,793 B2 | 6/2009 | Okuda et al. | |
| 7,610,891 B2 | 11/2009 | Seufert et al. | |
| 7,632,202 B2 | 12/2009 | Supina et al. | |
| 7,802,667 B2 | 9/2010 | Raszkowski et al. | |
| 7,824,307 B2 | 11/2010 | Matsubara et al. | |
| 7,908,067 B2 | 3/2011 | Soliman et al. | |
| 8,037,858 B2 | 10/2011 | Seufert et al. | |
| 8,062,172 B2 | 11/2011 | Supina et al. | |
| 8,090,512 B2 | 1/2012 | Cao et al. | |
| 8,090,520 B2 | 1/2012 | Tate, Jr. et al. | |
| 8,123,655 B2 | 2/2012 | Endo | |
| 8,190,317 B2 | 5/2012 | Kim et al. | |
| 8,192,324 B2 | 6/2012 | Kraska et al. | |
| 8,215,426 B2 | 7/2012 | Katsuta et al. | |
| 8,287,427 B2 | 10/2012 | Sah et al. | |
| 8,297,249 B2 | 10/2012 | Seufert et al. | |
| 8,303,463 B2 | 11/2012 | Sah et al. | |
| 8,384,237 B2 | 2/2013 | Nefcy et al. | |
| 8,412,427 B2 | 4/2013 | Ueoka et al. | |
| 8,436,489 B2 | 5/2013 | Stahlkopf et al. | |
| 8,450,884 B2 | 5/2013 | Stahlkopf et al. | |
| 8,475,329 B2 | 7/2013 | Sah | |
| 8,482,152 B1 | 7/2013 | Stahlkopf et al. | |
| 8,500,589 B2 | 8/2013 | Ortmann et al. | |
| 8,538,643 B1 | 9/2013 | Wang et al. | |
| 8,540,604 B1 | 9/2013 | Nefcy et al. | |
| 8,562,484 B1 | 10/2013 | Nedorezov et al. | |
| 8,565,990 B2 | 10/2013 | Ortmann et al. | |
| 2005/0054480 A1* | 3/2005 | Ortmann | B60K 6/365 477/6 |
| 2012/0265382 A1* | 10/2012 | Nefcy | B60W 10/06 701/22 |
| 2013/0053214 A1* | 2/2013 | Kawai | B60W 10/02 477/5 |
| 2014/0018207 A1* | 1/2014 | Kobayashi | B60K 6/48 477/5 |
| 2014/0330469 A1* | 11/2014 | Yoshida | B60W 10/06 701/22 |

OTHER PUBLICATIONS

Anonymous, "Dual Clutch Powershift Life Analysis Process," IPCOM No. 000143581, Published Nov. 29, 2006, 3 pages.

* cited by examiner

SYSTEMS AND METHODS FOR IMPROVING VEHICLE DRIVELINE OPERATION

FIELD

The present description relates to systems and methods for improving vehicle driveline operation. The system and methods may be particularly useful for a vehicle that includes an engine that may be selectively coupled to a driveline.

BACKGROUND AND SUMMARY

A hybrid vehicle driveline may include an engine that is selectively mechanically coupled to an electric machine via a driveline disconnect clutch. The engine and/or electric machine provide torque to a driveline that includes a transmission. The transmission may include a plurality of fixed gears that may be selected based on vehicle speed and driver demand torque. Transmission clutches allow different gears to be operable at different times. The driveline disconnect clutch and the transmission clutches may both be supplied an operating fluid to apply the clutches. However, a pump supplying operating fluid to both clutches may not have sufficient capacity to supply the driveline disconnect clutch and a transmission clutch without one of the clutches slipping more than a desired amount.

The inventors herein have recognized the above-mentioned disadvantages and have developed a driveline operating method, comprising: delaying a clutch filling boosting phase of a driveline disconnect clutch positioned between an engine and an electric machine until a transmission clutch filling boosting phase reaches a predetermined condition during a power on downshift or a power on upshift.

By delaying application of one clutch while the other clutch is being applied, it may be possible to provide the technical result of smoother driveline operation. In particular, it may be possible to reduce clutch slippage and transmission shifting time by not allowing clutch filling boosting phases for two different clutches to take place at the same time. For example, application of one clutch may be delayed until the other clutch ends its clutch filling boosting phase. As a result, it may be possible to operate both a driveline disconnect clutch and a transmission clutch with a single pump that would otherwise lack capacity to operate both the driveline disconnect clutch and a transmission clutch in a desired manner.

The present description may provide several advantages. In particular, the approach may allow for a lower capacity pump to supply transmission fluid to both a driveline disconnect clutch and a transmission clutch. Further, the approach may reduce the possibility of undesirable driveline operation. Further still, the approach may improve driver satisfaction regarding the vehicle driving experience.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
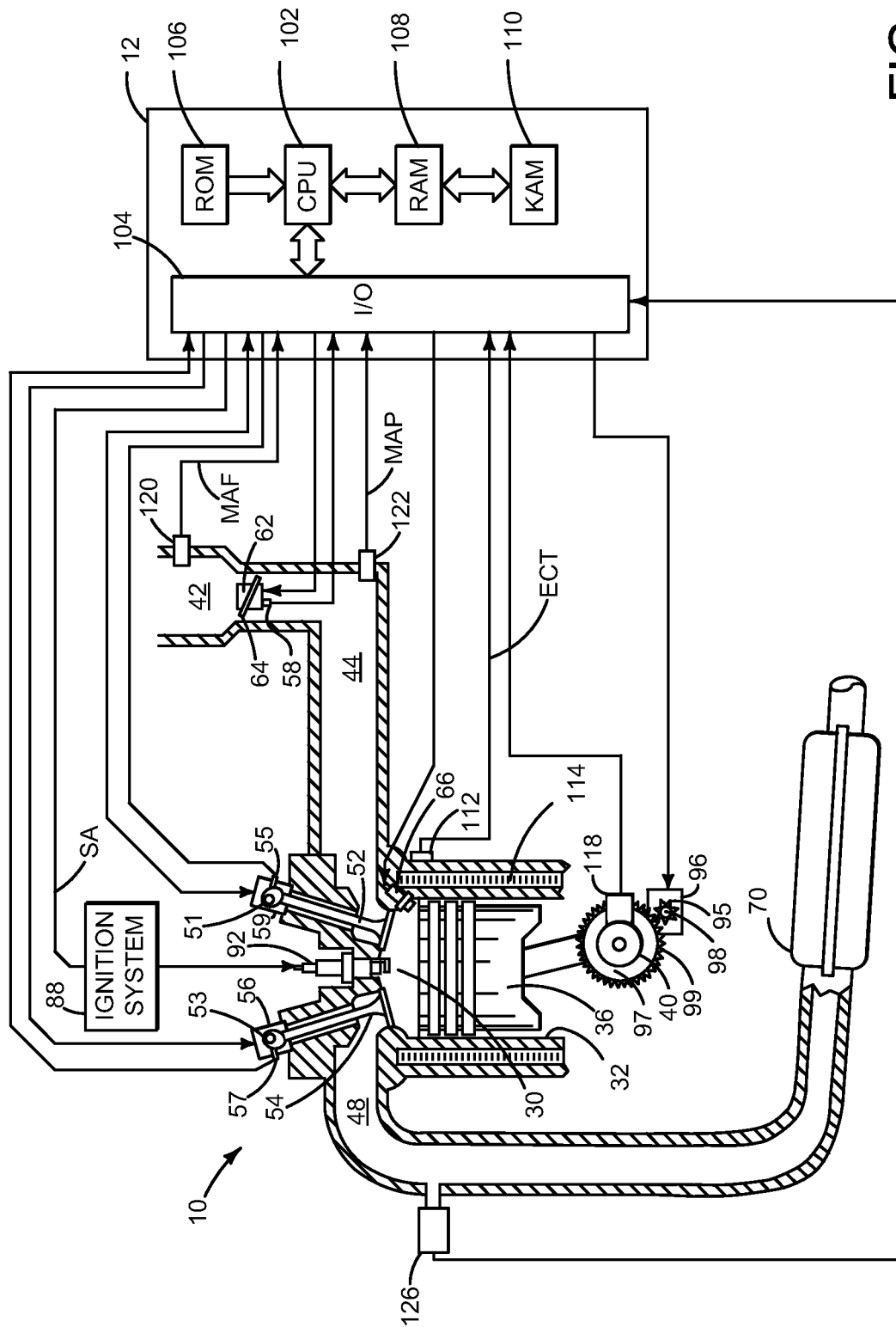
FIG. 1 is a schematic diagram of an engine.
Figure 2:
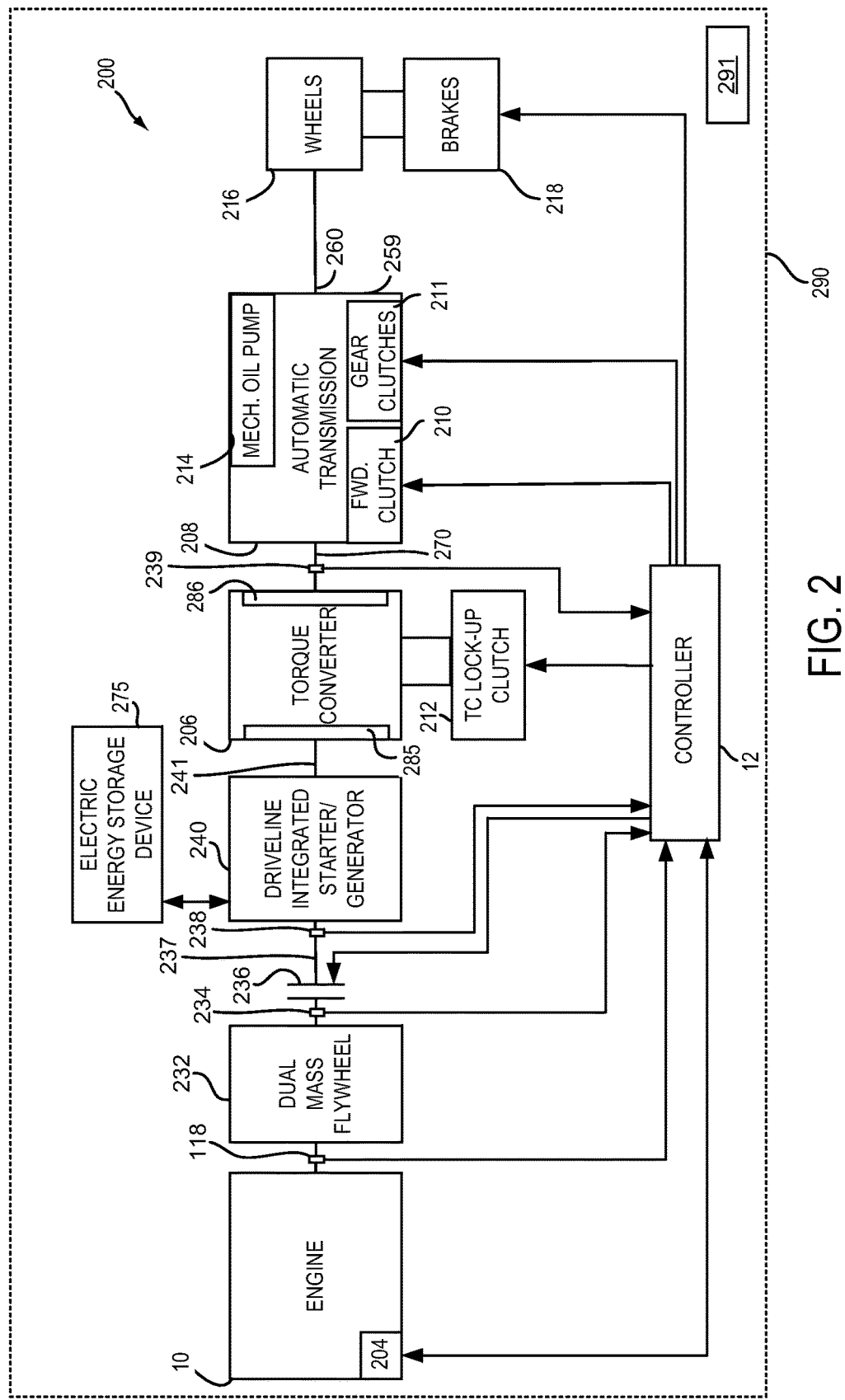
FIG. 2 shows an example vehicle driveline configuration.
Figure 3:
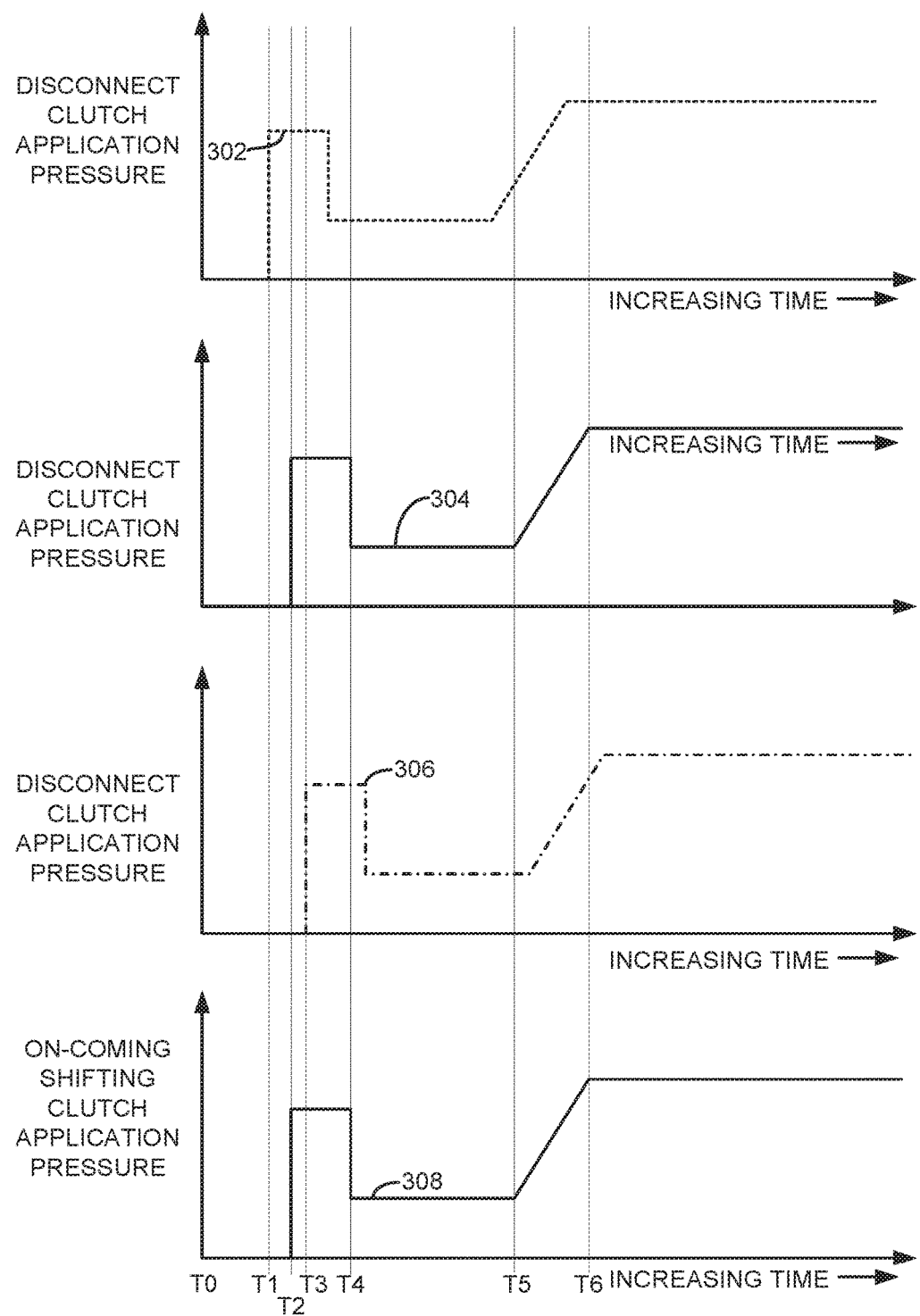
FIGS. 3-5 show example clutch application sequences.

The present description is related to operating clutches of a hybrid vehicle. The vehicle may include an engine as is shown in FIG. 1. The engine may be mechanically coupled to other vehicle components including a motor to form a driveline as is shown in FIG. 2. The engine and the motor may be selectively coupled and decoupled to change driveline operating modes. Clutches in the driveline may avoid being operated as is shown in FIG. 3. Clutches in the driveline may be operated according to the sequences shown in FIGS. 4-5 according to the method of FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Timing of exhaust cam 53 may be varied with respect to timing of crankshaft 40 using exhaust cam phase adjuster 56 so as to adjust exhaust valve opening and closing positions relative to crankshaft position. Timing of intake cam 51 may be varied with respect to timing of crankshaft 40 using exhaust cam phase adjuster 59 so as to adjust exhaust valve opening and closing positions relative to crankshaft position.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to a pulse width of a signal from controller 12. Fuel is delivered to fuel injector 66 by a fuel system (e.g. shown in FIG. 2) including a fuel tank, fuel pump, and fuel rail. In addition, intake manifold 44 is shown communicating with optional electronic throttle 62 which adjusts a position of throttle plate 64 to control air flow from air intake 42 to intake manifold 44. In one example, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10 in vehicle 290. The vehicle 290 may include a passenger cabin 291 for transporting passengers.

Engine 10 may be started with an engine starting system shown in FIG. 1 or via driveline integrated starter/generator (DISG) or electric machine (e.g. motor) 240. Further, engine 10 may generate or adjust torque via torque actuator 204, such as a fuel injector, throttle, cam, ignition coil, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of driveline disconnect clutch 236. Driveline disconnect clutch 236 may be electrically or hydraulically actuated and it may be positioned outside of transmission case 259. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to automatic transmission 208 to be adjusted. Controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, driveline disconnect clutch 240, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases. In some examples, pump 214 has insufficient capacity to simultaneously supply the disconnect clutch during its pressure boost phase and the at least one shifting clutch during its pressure boost phase without increasing transmission shift time.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by cranking engine 10 via a starter or the DISG and resuming cylinder combustion.

Figure 6:
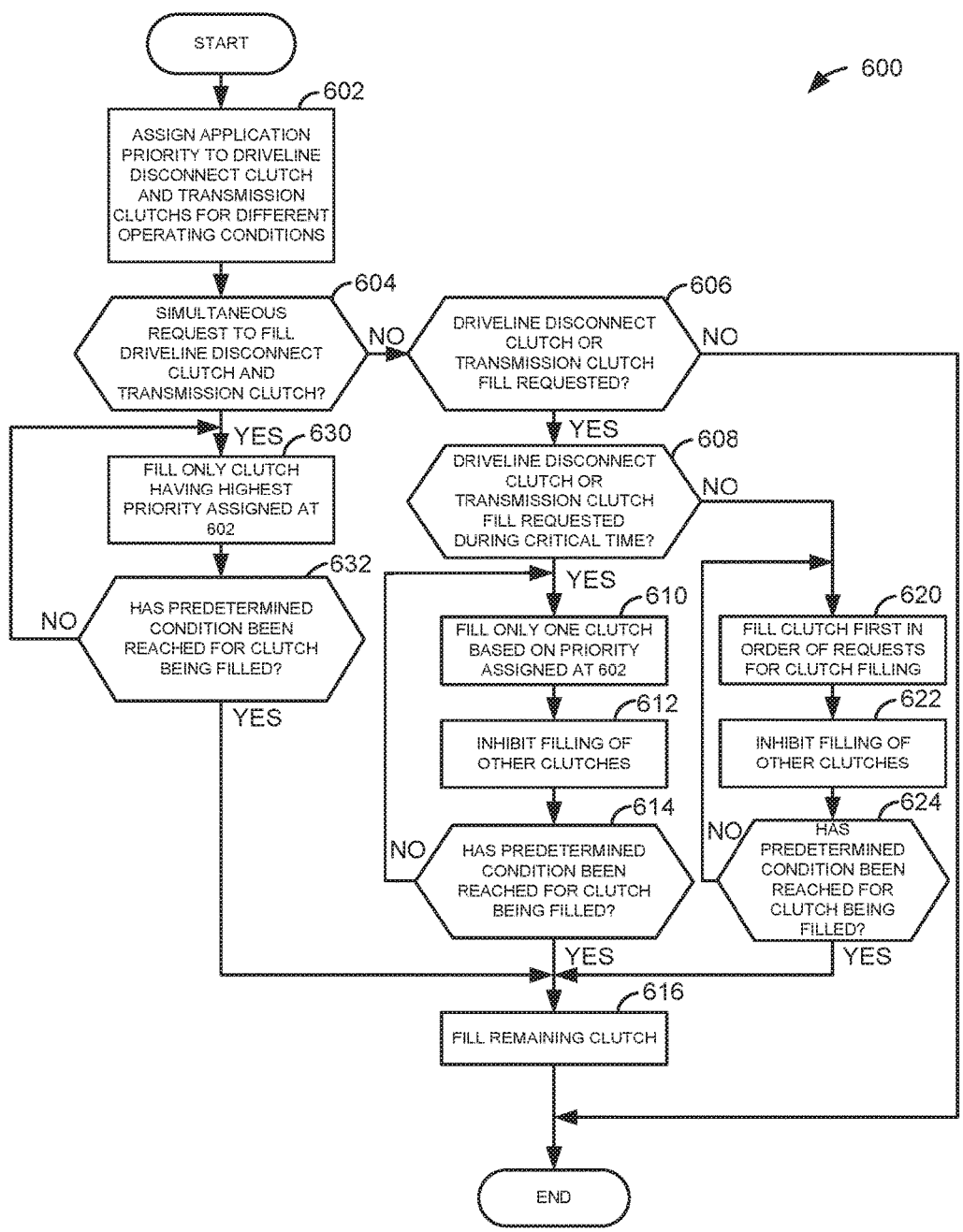
FIG. 6 shows a flowchart of an example method for supplying operating fluid to both a driveline disconnect clutch and transmission clutches.

Referring now to FIG. 3, an example simulated driveline clutch operating sequence is shown. Three different examples of clutch filling overlap or simultaneous clutch filling that may be avoided by the method of FIG. 6 are shown. Vertical markers T0-T4 show timings of particular events during the operating sequence. Traces 302-306 are at a same position when only solid trace 304 is visible.

The first plot from the top of FIG. 3 is a plot of driveline disconnect clutch application pressure versus time. The Y axis represents driveline disconnect clutch application pressure and pressure increases in the direction of the Y axis arrow. The X axis represents time and time increases from the left to right side of the plot. Trace 302 represents applying pressure to or filling the driveline disconnect clutch beginning at a time earlier than a time pressure is applied or filling begins for the on-coming shifting clutch.

The second plot from the top of FIG. 3 is a plot of driveline disconnect clutch application pressure versus time. The Y axis represents driveline disconnect clutch application pressure and pressure increases in the direction of the Y axis arrow. The X axis represents time and time increases from the left to right side of the plot. Trace 304 represents applying pressure to or filling the driveline disconnect clutch beginning at a same time as a time pressure is applied or filling begins for the on-coming shifting clutch.

The third plot from the top of FIG. 3 is a plot of driveline disconnect clutch application pressure versus time. The Y axis represents driveline disconnect clutch application pressure and pressure increases in the direction of the Y axis arrow. The X axis represents time and time increases from the left to right side of the plot. Trace 306 represents applying pressure to or filling the driveline disconnect clutch after pressure is applied or filling begins for the on-coining shifting clutch.

The fourth plot from the top of FIG. 3 is a plot of on-coming shifting clutch (e.g., a transmission gear clutch) application pressure versus time. The on-coming clutch may be a clutch for activating $2^{nd}$ or $3^{rd}$ gear, for example. The Y axis represents driveline disconnect clutch application pressure and pressure increases in the direction of the Y axis arrow. The X axis represents time and time increases from the left to right side of the plot. Trace 308 represents pressure applied to the on-coming shifting clutch.

At time T0, traces 302-308 are at low levels indicating that no clutches are being applied or are in the process of being applied. The driveline disconnect clutch is open when pressure is not applied to the driveline disconnect clutch. The on-coming clutch is not applied, but a different clutch (not shown) may be applied.

At time T1, pressure is applied to the driveline disconnect clutch according to trace 302. Pressure or force may be applied to the driveline disconnect clutch by allowing transmission fluid (e.g., oil) to flow to the driveline disconnect clutch from the transmission pump. Pressure within the driveline disconnect clutch increases as transmission fluid enters the driveline disconnect clutch. The initial filling phase or boost phase for filling the driveline disconnect clutch according to trace 302 begins at time T1 and ends at a time between T3 and T4 when the driveline disconnect clutch application pressure is reduced to a pressure at the beginning of the constant pressure phase. In this way, when pressure is applied to the driveline disconnect clutch according to trace 302, and when pressure is applied to the on-coming clutch according to trace 308, driveline disconnect clutch pressure during the filling or boost phase of the driveline disconnect clutch is advanced of on-coming clutch filling and overlaps partially with on-coming clutch pressure during the filling or boost phase of the on-coming clutch.

At time T2, pressure is applied to the driveline disconnect clutch according to trace 304. The initial filling phase or boost phase for filling the driveline disconnect clutch according to trace 304 begins at time T2 and ends at a time T4 when the driveline disconnect clutch application pressure is reduced to a pressure at the beginning of the constant pressure phase. The initial filling phase or boost phase for filling the on-coming clutch also begins at time T2 as indicated by trace 308. The filling or boost phase for the on-coming clutch ends at time T4 as indicated by the reduction in pressure of trace 308 at time T4. Thus, when pressure is applied to the driveline disconnect clutch according to trace 306, and when pressure is applied to the on-coming clutch according to trace 308, driveline disconnect clutch pressure during the filling or boost phase of the driveline disconnect clutch overlaps exactly with on-coming clutch pressure during the filling or boost phase of the on-coming clutch.

At time T3, pressure is applied to the driveline disconnect clutch according to trace 306. The initial filling phase or boost phase for filling the driveline disconnect clutch according to trace 306 begins at time T3 and ends at a time after time T4 when the driveline disconnect clutch application pressure is reduced to a pressure at the beginning of the constant pressure phase. In this way, when pressure is applied to the driveline disconnect clutch according to trace 306, and when pressure is applied to the on-coming clutch according to trace 308, driveline disconnect clutch pressure during the filling or boost phase of the driveline disconnect clutch is delayed from on-coming clutch filling and overlaps partially with on-coming clutch pressure during the filling or boost phase of the on-coming clutch.

At time T4, the filling or boost phase for the driveline disconnect clutch according to trace 304 ends. Likewise, the filling or boost phase for the on-coming clutch ends at time T4 according to trace 308. The constant pressure phase for the driveline disconnect clutch according to trace 304, and the constant pressure phase for the on-coming clutch according to trace 308, begin at time T4. The constant pressure phase for the driveline disconnect clutch according to trace 304 and the constant pressure phase for the on-coming clutch according to trace 308 end at time T5. The pressure ramping phase for the driveline disconnect clutch according to trace 304, and the pressure ramping phase for the on-coming clutch according to trace 308, begin at time T5. The pressure ramping phase for the driveline disconnect clutch according to trace 304 and the pressure ramping phase for the on-coming clutch according to trace 308 end at time T6. Boost phase, constant pressure phase, and pressure ramp phase for all clutch pressures shown in FIGS. 3-5 are recognizable as previously described.

Thus, it may be observed from traces 302-308 that a boost phase for closing one clutch may overlap with a boost phase for closing a different clutch. Since the clutches hold little if any fluid before the boost phase of the respective clutch, a transmission fluid pump may not be able to supply adequate fluid flow to close two or more clutches in a boost phase at the same time.

Figure 4:
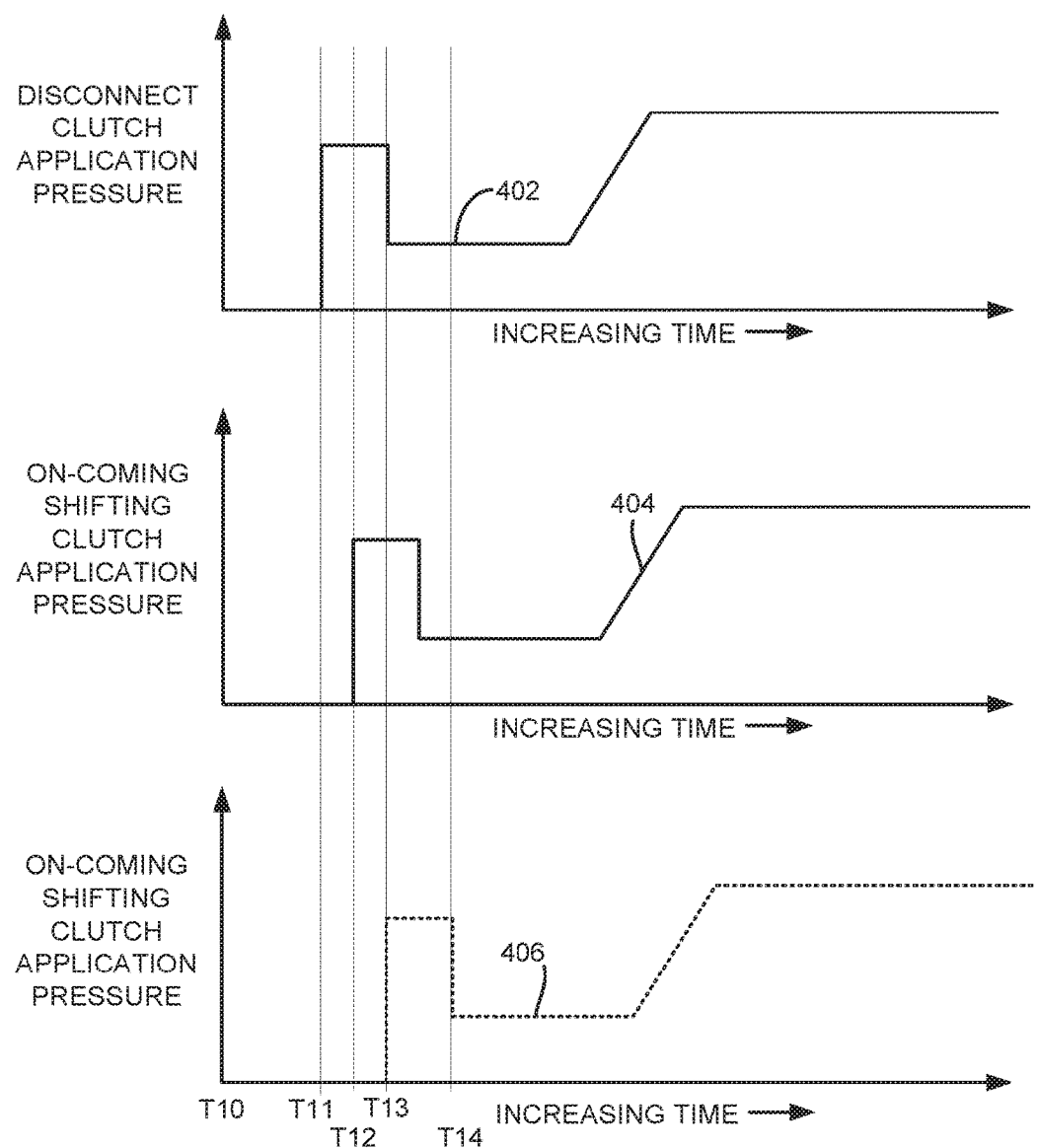
Figure 5:
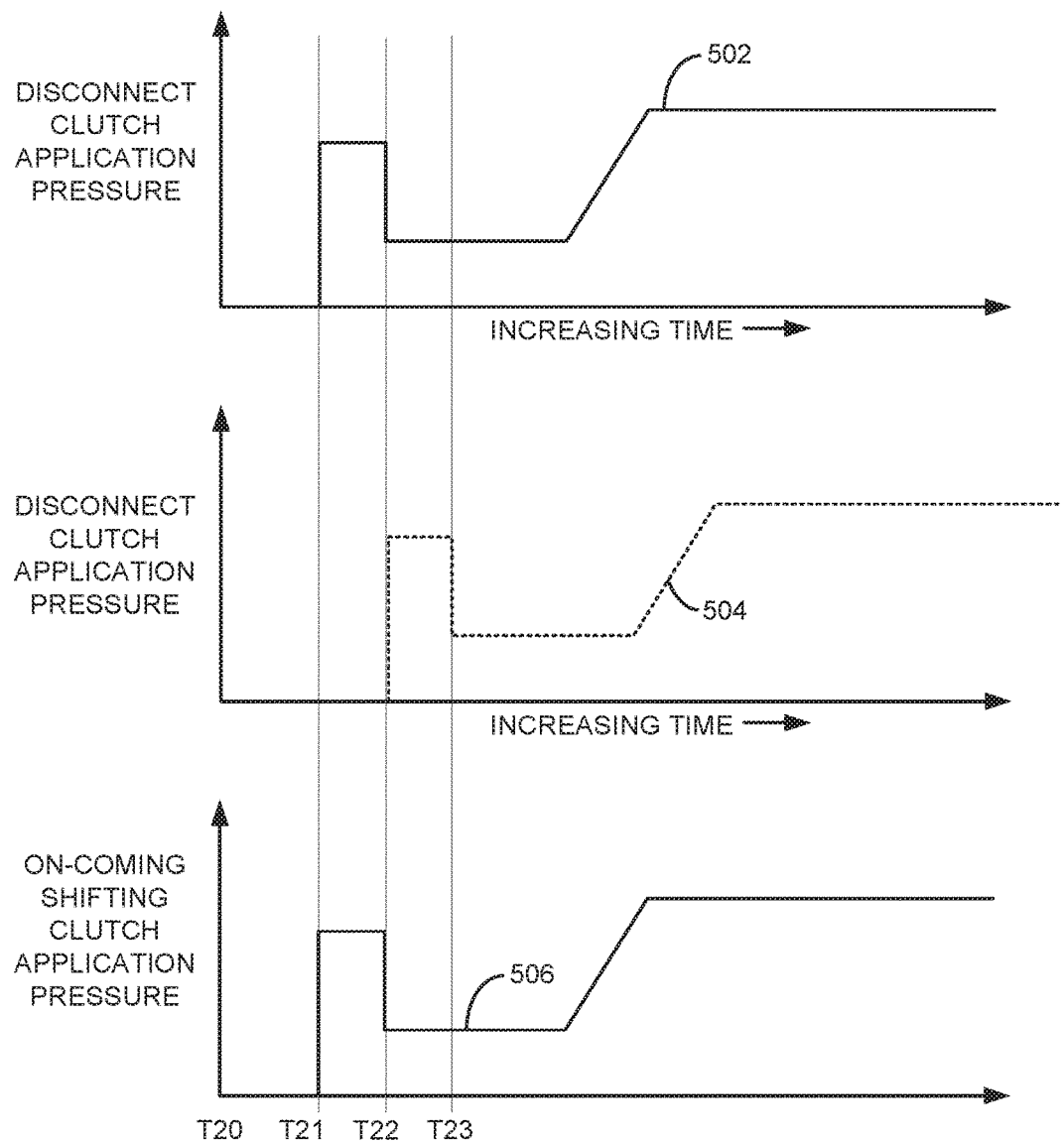

Referring now to FIG. 4, an example simulated driveline clutch operating sequence is shown. Portions of operating sequence of FIG. 4 may be provided by the system of FIGS. 1 and 2 according to the method of FIG. 6. Vertical markers T10-T14 show timings of particular events during the operating sequence. The first plot of FIG. 4 represents the same disconnect clutch application pressure described in the first plot from the top of FIG. 3. Similarly, the second and third plots of FIG. 4 show the same on-coming shifting clutch application pressure described in the second plot from the top of FIG. 3. Therefore, for the sake of brevity, the description of the plots is limited to items that are different from the items shown in FIG. 3.

The example sequence of FIG. 4 shows an example of delaying an on-coming clutch in response to closing or increasing the pressure of the driveline disconnect clutch in a boost phase.

At time T10, traces 402-406 are at low levels indicating that no clutches are being applied or are in the process of being applied. The driveline disconnect clutch is open when pressure is not applied to the driveline disconnect clutch. The on-coming clutch is not applied, but a different clutches (not shown) may be applied.

At time T11, pressure is applied to the driveline disconnect clutch according to trace 402. Pressure or force may be applied to the driveline disconnect clutch by allowing transmission fluid (e.g., oil) to flow to the driveline disconnect clutch from the transmission pump. In one example, a valve is opened in response to a desire or request to close the driveline disconnect clutch. Closing the driveline disconnect clutch mechanically couples an engine to a motor. Pressure within the driveline disconnect clutch increases as transmission fluid enters the driveline disconnect clutch. The initial filling phase or boost phase for filling the driveline disconnect clutch according to trace 402 begins at time T11 and ends at a time T13. Neither trace 404 nor trace 406 shows pressure being supplied to the on-coming clutch at time T11. Consequently, the transmission pump may have sufficient capacity to begin closing the driveline disconnect clutch at time T11.

At time T12, trace 404 shows that pressure is being applied to the on-coming clutch when overlap between boost phases of different clutches is allowed contrary to the method of FIG. 6. The initial filling phase or boost phase for filling the on-coming clutch according to trace 404 begins at time T12 and ends at a time between time T13 and time T14. During such conditions between the on-coming clutch (e.g., trace 404) and the driveline disconnect clutch (e.g., trace 402), the transmission pump may have insufficient capacity to fill the driveline disconnect clutch and the on-coming clutch in a desired way. Therefore, the on-coming pressure may be delayed as shown by trace 406 according to the method of FIG. 6.

At time T13, pressure applied to the driveline disconnect clutch according to trace 402 is reduced and pressure applied to the on-coming clutch according to trace 406 and according to the method of FIG. 6 is increased. Trace 406 shows the on-coming clutch entering a boost phase at a time the driveline disconnect clutch exits its boost phase. Thus, the boost phase of the driveline disconnect clutch application pressure does not overlap with the boost phase of the on-coming clutch in accord with the method of FIG. 6. By delaying the boost phase of the on-coming clutch, it may be possible to reduce the instantaneous demand on the transmission pump such that the transmission pump has capacity to apply both the driveline disconnect clutch and the on-coming clutch. The driveline disconnect clutch enters its constant pressure phase at time T13.

At time T14, the filling or boost phase for the on-coming clutch (e.g., trace 406) is completed and the on-coming clutch enters its constant pressure phase. Both the driveline disconnect clutch and the on-coming clutch are in their respective constant pressure phases after time T14, but the driveline disconnect clutch enters its ramping phase earlier in time.

Thus, it may be observed from traces 402-406 that a boost phase for closing one clutch may be delayed from a boost phase for closing a different clutch. Since the boost phases of the respective clutches do not overlap, a transmission fluid pump may be able to supply adequate fluid flow to close two or more clutches within a short period of time.

Referring now to FIG. 5, an example simulated driveline clutch operating sequence is shown. Portions of operating sequence of FIG. 5 may be provided by the system of FIGS. 1 and 2 according to the method of FIG. 6. Vertical markers T20-T23 show timings of particular events during the operating sequence. The first and second plots of FIG. 5 represents the same disconnect clutch application pressure described in the first plot from the top of FIG. 3. Similarly, the third plot of FIG. 5 represents the same on-coming shifting clutch application pressure described in the second plot from the top of FIG. 3. Therefore, for the sake of brevity, the description of the plots is limited to items that are different from the items shown in FIG. 3.

The example sequence of FIG. 5 shows an example of delaying a driveline disconnect clutch in response to closing or increasing the pressure of an on-coming clutch in a boost phase.

At time T20, traces 502-506 are at low levels indicating that no clutches are being applied or are in the process of being applied. The driveline disconnect clutch is open when pressure is not applied to the driveline disconnect clutch. The on-coming clutch is not applied, but a different clutches (not shown) may be applied.

At time T21, pressure is applied to the on-coming clutch according to trace 506. Pressure or force may be applied to the on-coming clutch by allowing transmission fluid (e.g., oil) to flow to the on-coming clutch from the transmission pump. In one example, a valve is opened in response to a desire or request to shift transmission gears. Closing the on-coming clutch mechanically couples the transmission input shaft to the transmission output shaft via a selected gear. Pressure within the on-coming clutch increases as transmission fluid enters the on-coming clutch. The initial filling phase or boost phase for filling the on-coming clutch according to trace 506 begins at time T21 and ends at a time T22. At the same time, contrary to the method of FIG. 6, trace 502 shows the boost phase beginning for the driveline disconnect clutch. However, as previously mentioned, simultaneously entering the boost phase of the driveline disconnect clutch and the on-coming clutch may not allow the driveline to operate as desired. Consequently, the driveline disconnect clutch boost phase may be delayed to time T22 as shown by trace 504.

At time T22, trace 506 shows that pressure applied to the on-coming clutch is reduced to enter the constant pressure phase, while shortly thereafter, pressure applied to the driveline disconnect clutch is increased to enter a boost phase as shown in trace 504. Pressure applied to the driveline disconnect clutch as shown in trace 502 is reduced to enter a constant pressure phase. Operation of the driveline disconnect clutch as shown in trace 504 conforms to the method of FIG. 6, whereas operation of the driveline disconnect clutch according to trace 502 does not conform to the method of FIG. 6. During such conditions between the on-coming clutch (e.g., trace 506) and the driveline disconnect clutch (e.g., trace 502), the transmission pump may have insufficient capacity to fill the on-coming clutch and the driveline disconnect clutch in a desired way. Therefore, the driveline disconnect clutch pressure may be delayed as shown by trace 504 according to the method of FIG. 6.

At time T23, pressure applied to the driveline disconnect clutch according to trace 504 is reduced. Trace 506 shows the on-coming clutch has previously entered its constant pressure phase. Thus, the boost phase of the driveline disconnect clutch application pressure does not overlap with the boost phase of the on-coming clutch in accord with the method of FIG. 6. By delaying the boost phase of the driveline disconnect clutch, it may be possible to reduce the instantaneous demand on the transmission pump such that the transmission pump has capacity to apply both the on-coming clutch and the driveline disconnect clutch.

Thus, it may be observed from traces 502-506 that the boost phase for closing the driveline disconnect clutch may be delayed from the boost phase of the on-going clutch. Since the boost phases of the respective clutches do not overlap, a transmission fluid pump may be able to supply adequate fluid flow to close two or more clutches within a short period of time.

Referring now to FIG. 6, a method for operating a driveline disconnect clutch and transmission clutches is shown. The method of FIG. 6 may be stored as executable instructions in non-transitory memory of the system shown in FIGS. 1 and 2. Further, the system of FIG. 6 may provide operation as shown in FIGS. 4 and 5.

At 602, method 600 assigns application priority to the driveline disconnect clutch and transmission clutches for different operating conditions. For example, a driveline disconnect clutch may be assigned a higher priority than a transmission shifting or gear clutch for a condition where requests for closing the driveline disconnect clutch and the transmission shifting or gear clutch occur at the same time during a condition of a driver demand torque greater than a threshold torque (e.g., during a power on upshift or downshift). In another example, a transmission shifting clutch may have a higher priority than the driveline disconnect clutch during a power on upshift or downshift. In some examples, a transmission shifting or gear clutch may be assigned a higher priority than a driveline disconnect clutch for a condition where requests for closing the driveline disconnect clutch and the transmission shifting or gear clutch occur at the same time during a condition of a driver demand torque less than a threshold torque (e.g., during a power off upshift or downshift). In still other examples, a driveline disconnect clutch may be assigned higher priority than a transmission shifting clutch during a power off upshift or downshift. Method 600 proceeds to 604 after priorities are assigned to driveline disconnect clutch application and transmission on-coming clutch application.

At 604, method 600 judges whether or not there are simultaneous requests to fill or apply the driveline disconnect clutch and one of the transmission clutches. A simultaneous request for the driveline disconnect clutch and the transmission clutches may occur if requests for applying the driveline disconnect clutch and transmission clutches occur or are received at the same time or within a predefined time threshold of each other. If driveline disconnect clutch application and transmission clutch application occur at the same time or within a threshold amount of time, the answer is yes and method 600 proceeds to 630. Otherwise, the answer is no and method 600 proceeds to 606.

A request to apply the driveline disconnect clutch at 604 may be made in response to a request or desire to start the engine. Further, the driveline disconnect clutch may be closed during some conditions after the engine has started and is within a threshold speed of motor speed. The transmission clutches may be requested to close in response to a power on upshift or downshift (e.g., a transmission gear upshift or downshift is requested while the driveline motor or DISG is applying a positive torque to the driveline in response to a driver demand torque). Alternatively, the transmission clutches may be requested to close in response to a power off upshift or downshift (e.g., a transmission gear upshift or downshift is requested while the driveline motor or DISG is not applying a positive torque to the driveline).

At 606, method 600 judges whether or not the driveline disconnect clutch or a transmission clutch filling is requested. In one example, a bit or variable in memory may change state (e.g., from 0 to 1) when a driveline disconnect clutch is requested to close and a different bit or variable may change state when a transmission shifting clutch is requested to close. Method 600 may inquired as to the status of the variable and determine whether or not the driveline disconnect clutch and/or a transmission clutch are being requested to close. If method 600 judges that the driveline disconnect clutch is requested closed or a transmission clutch is requested closed, the answer is yes and method 600 proceeds to 608. Otherwise, the answer is no and method 600 proceeds to exit.

At 608, method 600 judges whether or not the driveline disconnect clutch or a transmission clutch filling is requested at a critical time. In one example, a critical time may be during a power on condition (e.g., when the motor is applying a positive torque to the driveline). If method 600 judges that the driveline disconnect clutch is requested closed or a transmission clutch is requested closed during a critical time, the answer is yes and method 600 proceeds to 610. Otherwise, the answer is no and method 600 proceeds to 620.

At 610, method 600 fills only one clutch based on the clutch priority assigned at 602. In particular, the clutch assigned the highest priority at 602 is allowed to fill beginning with a boost phase where pressure is increased to a first level before being reduced and entering a constant pressure phase of clutch application. The clutch being filled may continue filling through constant pressure and pressure ramping phased until it is closed. The clutch being filled may be filled via opening a valve that controls transmission fluid flow to the clutch. Method 600 proceeds to 612 after the clutch begins to fill.

At 612, method 600 inhibits filling of other clutches that may be requested to close during the time the priority clutch is being filled. Transmission fluid flow to other clutches may be inhibited via holding one or more valves closed. Method 600 proceeds to 614 after other clutches (e.g., transmission clutches or the driveline disconnect clutch) are inhibited from closing. In this way, there may be no overlap of attempting to apply more than one clutch before predetermined conditions have been met. For example, boost phases of two clutches requested to be applied will not overlap.

At 614, method 600 judges whether or not predetermined conditions have been met since the clutch having the highest priority began to close at 610. In example, the predetermined condition is that the clutch being applied has exited its boost phase and entered a constant pressure phase. The boost phase may be complete when the clutch pressure is reduced to enter the constant pressure phase. In other examples, other conditions may be judged at 614. For example, method 600 may judge that a predetermined condition is satisfied when a predetermined volume in the clutch being applied has been filled with transmission fluid. In other examples, method 600 may judge that the predetermined condition has been satisfied when the torque transfer capacity of the clutch being applied reaches a threshold level or when a predetermined amount of time since fluid was allowed to the clutch being applied has expired. If method 600 judges that the predetermined conditions have been met, the answer is yes and method 600 proceeds to 616. Otherwise, the answer is no and method 600 returns to 610.

At 616, method 600 allows the other clutch that has been requested to be closed to be filled by fluid from the transmission pump. The other clutch may be the driveline disconnect clutch or a transmission clutch. The remaining clutch may be filled via opening a valve that allows transmission fluid to flow to the other clutch. The clutch being filled may continue filling through constant pressure and pressure ramping phased until it is closed. In this way, it is possible to delay a clutch filling boosting phase of a driveline disconnect clutch positioned between an engine and an electric machine until only after a transmission clutch filling boosting phase reaches a predetermined condition during a power on downshift or a power on upshift. Similarly, it is possible to delaying a clutch filling boosting phase of a transmission clutch until only after a driveline disconnect clutch positioned between an engine and a transmission reaches a predetermined condition during a power off downshift or a power off upshift. Method 600 proceeds to exit after the other clutch begins to fill.

At 620, method 600 fills a clutch that was first requested to be filled. Clutches that are requested to be closed may be assigned an order of filling based on the timing that the respective clutches were requested to be filled. For example, if a driveline disconnect clutch is a first clutch to be requested to be closed and a request is made to close a $3^{rd}$ gear clutch a short time later, the driveline disconnect clutch is assigned first to be closed in an order of clutches being closed and the $3^{rd}$ gear clutch is assigned second in order to be filled. The clutch being filled may continue filling through constant pressure and pressure ramping phased until it is closed. Method 600 begins to fill the first clutch in the order of clutches to be filled and proceeds to 622.

At 622, method 600 inhibits filling of other clutches that may be requested to close during the time the first clutch in the clutch order is being filled. Transmission fluid flow to other clutches may be inhibited via holding one or more valves closed. Method 600 proceeds to 624 after other clutches (e.g., transmission clutches or the driveline disconnect clutch) are inhibited from closing. In this way, there may be no overlap of attempting to apply more than one clutch before predetermined conditions have been met. For example, boost phases of two clutches requested to be applied will not overlap.

At 624, method 600 judges whether or not predetermined conditions have been met since the clutch having the clutch first in the order of clutches to be filled began to close at 620. In example, the predetermined condition is that the clutch being applied has exited its boost phase and entered a constant pressure phase. The boost phase may be complete when the clutch pressure is reduced to enter the constant pressure phase. In other examples, other conditions may be judged at 624. For example, method 600 may judge that a predetermined condition is satisfied when a predetermined volume in the clutch being applied has been filled with transmission fluid. In other examples, method 600 may judge that the predetermined condition has been satisfied when the torque transfer capacity of the clutch being applied reaches a threshold level or when a predetermined amount of time since fluid was allowed to the clutch being applied has expired. If method 600 judges that the predetermined conditions have been met, the answer is yes and method 600 proceeds to 616. Otherwise, the answer is no and method 600 returns to 620.

At 630, of the clutches requested to be closed simultaneously, method 600 fills only a clutch having a highest priority assigned at 620. For example, if the driveline disconnect clutch has a higher priority than a gear clutch at the present conditions, only the driveline disconnect clutch begins to close. The clutch being filled may continue filling through constant pressure and pressure ramping phased until it is closed. Method 600 proceeds to 632 after the clutch begins to close.

At 632, method 600 judges whether or not predetermined conditions have been met since the clutch having the clutch first in the order of clutches to be filled began to close at 620. In example, the predetermined condition is that the clutch being applied has exited its boost phase and entered a constant pressure phase. The boost phase may be complete when the clutch pressure is reduced to enter the constant pressure phase. In other examples, other conditions may be judged at 632. For example, method 600 may judge that a predetermined condition is satisfied when a predetermined volume in the clutch being applied has been filled with transmission fluid. In other examples, method 600 may judge that the predetermined condition has been satisfied when the torque transfer capacity of the clutch being applied reaches a threshold level or when a predetermined amount of time since fluid was allowed to the clutch being applied has expired. If method 600 judges that the predetermined conditions have been met, the answer is yes and method 600 proceeds to 616. Otherwise, the answer is no and method 600 returns to 630.

In this way, it may be possible to limit overlapping clutch filling times such that a transmission pump has capacity to fill all clutches. Further, filling of a second clutch after a first clutch begins to fill may be delayed until after selected portions of clutch filling are complete.

Thus, the method of FIG. 6 provides for a driveline operating method, comprising: delaying a clutch filling boosting phase of a driveline disconnect clutch positioned between an engine and an electric machine until only after a transmission clutch filling boosting phase reaches a predetermined condition during a power on downshift or a power on upshift. The method includes where the predetermined condition is gear clutch capacity reaching a threshold value. The method includes where the predetermined condition is a predetermined clutch volume is filled by a fluid. The method includes where the gear clutch filling boosting phase is followed by a gear clutch constant pressure phase. The method includes where the clutch filling boosting phase of the driveline disconnect clutch is initiated in response to an engine start request. The method further comprises delaying the clutch filling boosting phase of the driveline disconnect clutch in response to a power off downshift or a power off upshift. The method includes where the clutch filling boosting phase of the driveline disconnect clutch is at an onset of driveline disconnect clutch closing.

The method of FIG. 6 also provides for a driveline operating method, comprising: supplying a first pressure sequence to apply a driveline disconnect clutch, the first pressure sequence including a first boost phase, a first constant pressure phase, and a first ramp phase; supplying a second pressure sequence to apply a transmission shifting clutch, the second pressure sequence including a second boost phase, a second constant pressure phase, and a second ramp phase; and delaying one of the first boost phase or the second boost phase in response to the other of the first boost phase or the second boost phase. The method includes where the driveline disconnect clutch is positioned between an engine and an electric machine.

In some examples, the method includes where the transmission shifting clutch is a transmission gear clutch. The method includes where the first boost phase is delayed until an end of the second boost phase. The method also includes where the first boost phase is delayed until a predetermined transmission shifting clutch volume is displaced. The method also includes where the second boost phase is delayed until a predetermined driveline disconnect clutch volume is displaced. The method also includes where the second pressure sequence is provided in response to a power on upshift or downshift.

As will be appreciated by one of ordinary skill in the art, method described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A driveline operating method, comprising:
supplying a first pressure sequence to apply a driveline disconnect clutch, the first pressure sequence including a first boost phase, a first constant pressure phase, and a first ramp phase;
supplying a second pressure sequence to apply a transmission shifting clutch, the second pressure sequence including a second boost phase, a second constant pressure phase, and a second ramp phase; and
delaying one of the first boost phase or the second boost phase in response to the other of the first boost phase or the second boost phase.

2. The method of claim 1, where the driveline disconnect clutch is positioned between an engine and an electric machine, where a pressure of the first boost phase is greater than a pressure of the first constant pressure phase, and where a pressure of the second boost phase is greater than a pressure of the second constant pressure phase.

3. The method of claim 1, where the transmission shifting clutch is a transmission gear clutch, and further comprising:
not applying the driveline disconnect clutch immediately preceding the first boost phase in the first pressure sequence; and
not applying the transmission shifting clutch immediately preceding the second boost phase in the second pressure sequence.

4. The method of claim 1, where the first boost phase is delayed until an end of the second boost phase, and further comprising:

assigning a higher priority to the second pressure sequence than the first pressure sequence during a condition of driver demand less than a threshold so that the second boost phase precedes the first boost phase, and closing the transmission shifting clutch before the driveline disconnect clutch based on the higher priority.

5. The method of claim 1, where the first boost phase is delayed until a predetermined transmission shifting clutch volume is displaced.

6. The method of claim 1, where the second boost phase is delayed until a predetermined driveline disconnect clutch volume is displaced.

7. The method of claim 1, where the second pressure sequence is provided in response to a power on upshift or downshift.

8. The method of claim 1, further comprising assigning a higher priority to the first pressure sequence than the second pressure sequence during a condition of driver demand greater than a threshold so that the first boost phase precedes the second boost phase, and closing the driveline disconnect clutch before the transmission shifting clutch based on the higher priority.

9. The method of claim 8, further comprising simultaneous requests to close the driveline disconnect clutch and close the transmission shifting clutch.

10. The method of claim 1, further comprising beginning the second boost phase when the first constant pressure phase begins.

11. The method of claim 1, further comprising inhibiting closing of transmission clutches during filling of the driveline disconnect clutch.

12. The method of claim 1, where delaying one of the first boost phase or the second boost phase in response to the other of the first boost phase or the second boost phase includes delaying either the first boost phase or the second boost phase until a pressure of the other of the first boost phase and the second boost phase is reduced after increasing pressure of the first boost phase or pressure of the second boost phase to supply the first pressure sequence to apply the driveline disconnect clutch or to supply the second pressure sequence to apply the transmission shifting clutch.

* * * * *